US009503598B2

(12) United States Patent
Nishiyama (10) Patent No.: US 9,503,598 B2
(45) Date of Patent: Nov. 22, 2016

(54) IMAGE FORMING APPARATUS, IMAGE FORMING APPARATUS CONTROL METHOD, AND STORAGE MEDIUM STORING PROGRAM (71) Applicant: CANON KABUSHIKI KAISHA, Tokyo (JP)

(72) Inventor: Kaori Nishiyama, Tokyo (JP)

(73) Assignee: CANON KABUSHIKI HAISHA, Tokyo (JP)

(*) Notice: Subject to any disclaimer, the term of this patent is extended or adjusted under 35 U.S.C. 154(b) by 0 days.

(21) Appl. No.: 13/652,890

(22) Filed: Oct. 16, 2012

(65) Prior Publication Data
US 2013/0278960 A1 Oct. 24, 2013

(30) Foreign Application Priority Data

Nov. 10, 2011 (JP) .................................. 2011-246862

(51) Int. Cl.
H04N 1/00 (2006.01)
H04N 1/32 (2006.01)
H04N 1/44 (2006.01)

(52) U.S. Cl.
CPC ........ *H04N 1/0084* (2013.01); *H04N 1/00413* (2013.01); *H04N 1/00474* (2013.01); *H04N 1/32122* (2013.01); *H04N 1/4413* (2013.01); *H04N 1/4426* (2013.01); *H04N 1/4433* (2013.01); *H04N 2201/3202* (2013.01); *H04N 2201/3205* (2013.01); *H04N 2201/3214* (2013.01); *H04N 2201/3215* (2013.01); *H04N 2201/3219* (2013.01); *H04N 2201/3223* (2013.01); *H04N 2201/3273* (2013.01)

(58) Field of Classification Search
CPC ..................................................... H04N 1/0084
USPC .................................. 358/1.1–1.9, 1.11–1.18
See application file for complete search history.

(56) References Cited

U.S. PATENT DOCUMENTS

| 7,221,885 | B2* | 5/2007 | Sato ................................. 399/81 |
| 7,975,224 | B2* | 7/2011 | Paterson et al. .............. 715/274 |
| 8,089,644 | B2* | 1/2012 | Tsuchiya ..................... 358/1.14 |
| 2002/0059318 | A1* | 5/2002 | Nomura ............. H04N 1/00002 |

(Continued)

FOREIGN PATENT DOCUMENTS

| CN | 1733495 A | 2/2006 |
| CN | 1743977 A | 3/2006 |

(Continued)

OTHER PUBLICATIONS

Chinese Office Action issued in corresponding application No. 201210454723.X on Oct. 30, 2014.

(Continued)

Primary Examiner — King Poon
Assistant Examiner — Ibrahim Siddo
(74) Attorney, Agent, or Firm — Carter, DeLuca, Farrell & Schmidt, LLP (57) ABSTRACT Selection of a send job by a user is accepted in an execution history which displays the execution history of a send job for sending data to a destination. It is determined whether the user has an authority to execute the send job displayed in the execution history. If it is determined that the user has the authority, an item for reusing a destination used when the selected send job was executed is displayed in a screen including the execution history.

9 Claims, 10 Drawing Sheets

(56) References Cited

U.S. PATENT DOCUMENTS

| | | | |
|---|---|---|---|
| 2005/0057780 A1* | 3/2005 | Fujita | H04N 1/00222 358/400 |
| 2005/0111866 A1 | 5/2005 | Sato | |
| 2006/0023247 A1* | 2/2006 | Yamakawa | 358/1.14 |
| 2006/0045555 A1* | 3/2006 | Morimoto et al. | 399/80 |
| 2006/0059495 A1* | 3/2006 | Spector | 719/310 |
| 2006/0242579 A1* | 10/2006 | Mishima | G06F 3/0481 715/700 |
| 2006/0282782 A1* | 12/2006 | Yamada | H04N 1/00244 715/733 |
| 2009/0009795 A1* | 1/2009 | Kong | H04N 1/00222 358/1.15 |
| 2010/0042737 A1* | 2/2010 | Fujimoto et al. | 709/230 |
| 2011/0267649 A1* | 11/2011 | Akimoto | H04L 12/58 358/1.15 |
| 2013/0006673 A1* | 1/2013 | Hurston | G06Q 30/04 705/4 |

FOREIGN PATENT DOCUMENTS

| | | | |
|---|---|---|---|
| CN | 101312484 A | | 11/2008 |
| JP | 2005-297488 | * | 10/2005 |
| JP | 2005-297488 A | | 10/2005 |
| JP | 2007-060126 A | | 3/2007 |
| JP | 2008-028753 A | | 2/2008 |
| JP | 2008-259072 A | | 10/2008 |
| JP | 2010-044432 A | | 2/2010 |
| JP | 2011-193309 A | | 9/2011 |

OTHER PUBLICATIONS

Chinese Office Action issued in corresponding application No. 201210454723.X on Apr. 3, 2015.

Japanese Office Action issued in corresponding application No. 2011-246862 dated Sep. 4, 2015.

* cited by examiner

| FUNCTION | DETAILS OF FUNCTION | Administrator | Power User | General User | Limited User | Guest User |
|---|---|---|---|---|---|---|
| COPY | PRINT, PERMIT/DENY | Permit | Permit | Permit | Deny | Permit |
| | FULL COLOR/MONOCHROME | Color | Color | Color | BW | BW |
| | SINGLE-SIDED, PERMIT/DENY | Permit | Permit | Permit | Deny | Deny |
| | 1up/2up/4up | 1 | 1 | 1 | 4 | 4 |
| SCAN TO SEND | E-mail | Permit | Permit | Permit | Deny | Deny |
| | I-FAX | Permit | Permit | Permit | Deny | Deny |
| | FAX | Permit | Permit | Deny | Permit | Deny |
| | FTP | Permit | Permit | Deny | Permit | Deny |
| | NCP | Permit | Permit | Deny | Permit | Deny |
| | SMB | Permit | Permit | Deny | Permit | Deny |
| | WebDAV | Permit | Permit | Permit | Permit | Deny |
| | SENDING TO NEW DESTINATION, PERMIT/DENY | Permit | Permit | Deny | Deny | Deny |
| | DESTINATION DOMAIN DESIGNATION, PERMIT/DENY | Permit | Permit | Permit | Deny | Deny |
| | ADDITION OF PDF DEVICE SIGNATURE, YES/NO | No | No | No | Yes | Yes |
| | SENDING WITHOUT DEVICE SIGNATURE, PERMIT/DENY | Permit | Permit | Permit | Deny | Deny |
| | EDITING OF DESTINATION TABLE, PERMIT/DENY | Permit | Permit | Deny | Deny | Deny |
| SCAN TO SAVE | SCAN, PERMIT/DENY | Permit | Permit | Permit | Permit | Deny |
| | FULL COLOR/MONOCHROME | Color | Color | Color | BW | BW |
| USE STORED DOCUMENT | PRINT, PERMIT/DENY | Permit | Permit | Permit | Permit | Deny |
| | FULL COLOR/MONOCHROME | Color | Color | Color | BW | BW |
| | SINGLE-SIDED, PERMIT/DENY | Permit | Permit | Permit | Deny | Deny |
| | 1up/2up/4up | 1 | 1 | 1 | 4 | 4 |
| STATUS MONITOR | RE-SETTING OF JOB HISTORY, PERMIT/DENY | Permit | Permit | Permit | Permit | Deny |
| | OPERATION OF JOB OF ANOTHER USER, PERMIT/DENY | Permit | Deny | Deny | Deny | Deny |
| | DISPLAY OF JOB NAME OF ANOTHER USER, PERMIT/DENY | Permit | Permit | Permit | Permit | Deny |
| | USE OF JOB HISTORY OF ANOTHER USER, PERMIT/DENY | Permit | Permit | Permit | Deny | Deny |

FIG. 4

| USER NAME | uid | GROUP NAME | gid | permission group |
|---|---|---|---|---|
| a | 001 | DEVELOPMENT N | 501 | Limited User |
| b | 002 | DEVELOPMENT N | 501 | Limited User |
| c | 003 | DEVELOPMENT N | 501 | General User |
| d | 004 | DEVELOPMENT N | 501 | General User |
| e | 005 | DEVELOPMENT O | 502 | General User |
| f | 006 | DEVELOPMENT O | 502 | General User |
| g | 007 | DEVELOPMENT O | 502 | Limited User |
| h | 008 | DEVELOPMENT O | 502 | Limited User |
| i | 009 | MANAGEMENT P | 510 | Aministrator User |
| j | 010 | MANAGEMENT P | 510 | Aministrator User |
| k | 011 | MANAGEMENT Q | 511 | Power User |
| l | 012 | MANAGEMENT Q | 511 | Power User |
| m | 013 | DIVISION T | 520 | General User |
| n | 014 | DIVISION T | 520 | General User |

IMAGE FORMING APPARATUS, IMAGE FORMING APPARATUS CONTROL METHOD, AND STORAGE MEDIUM STORING PROGRAM

BACKGROUND OF THE INVENTION

1. Field of the Invention

The present invention relates to an image forming apparatus which manages a job history, an image forming apparatus control method, and a storage medium storing a program.

2. Description of the Related Art

As the number of functions of an image forming apparatus is increasing, user setting work on the screen becomes more complicated when executing a job. By reusing past settings, user setting friendliness is improved.

Japanese Patent Laid-Open No. 2005-297488 discloses a technique of calling an operation history in an image forming apparatus to be operated or a remote image forming apparatus in cooperation with user authentication, and reusing it for a screen operation. Japanese Patent Laid-Open No. 2007-60126 discloses a technique of specifying one job in a job history stored in an image forming apparatus to be operated or a remote image forming apparatus, and printing it again.

It is common practice to reuse the job execution history, as described above. However, an image forming apparatus is often shared between a plurality of users, unlike a PC, cellar phone, or the like. For example, a malicious user may illicitly use the execution history.

SUMMARY OF THE INVENTION

An aspect of the present invention is to eliminate the above-mentioned problems with the conventional technology. The present invention provides an image forming apparatus which prevents illicit use of an execution history, an image forming apparatus control method, and a storage medium storing a program.

The present invention in its first aspect provides an image forming apparatus comprising: a history display unit configured to display an execution history of a send job for sending data to a destination; a selection acceptance unit configured to accept selection of a send job by a user in the execution history displayed by the history display unit; a determination unit configured to determine whether the user has an authority to execute the send job displayed in the execution history; and an acceptance display unit configured to, when the determination unit determines that the user has the authority, display, in a screen including the execution history, an item for reusing a destination used when the selected send job was executed.

The present invention in its second aspect provides an image forming apparatus control method comprising: a history display step of displaying an execution history of a send job for sending data to a destination; a selection acceptance step of accepting selection of a send job by a user in the execution history displayed in the history display step; a determination step of determining whether the user has an authority to execute the send job displayed in the execution history; and an acceptance display step of, when the user is determined in the determination step to have the authority, displaying, in a screen including the execution history, an item for reusing a destination used when the selected send job was executed.

The present invention in its third aspect provides a non-transitory computer-readable storage medium storing a program for causing a computer to execute a history display step of displaying an execution history of a send job for sending data to a destination, a selection acceptance step of accepting selection of a send job by a user in the execution history displayed in the history display step, a determination step of determining whether the user has an authority to execute the send job displayed in the execution history, and an acceptance display step of, when the user is determined in the determination step to have the authority, displaying, in a screen including the execution history, an item for reusing a destination used when the selected send job was executed.

The present invention can prevent illicit use of history information.

Further features of the present invention will become apparent from the following description of exemplary embodiments with reference to the attached drawings.

BRIEF DESCRIPTION OF THE DRAWINGS

FIG. 3 is a table exemplifying a function restriction list;

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same building components, and a repetitive description thereof will be omitted.

First Embodiment

Arrangement of Image Forming System

Figure 1:
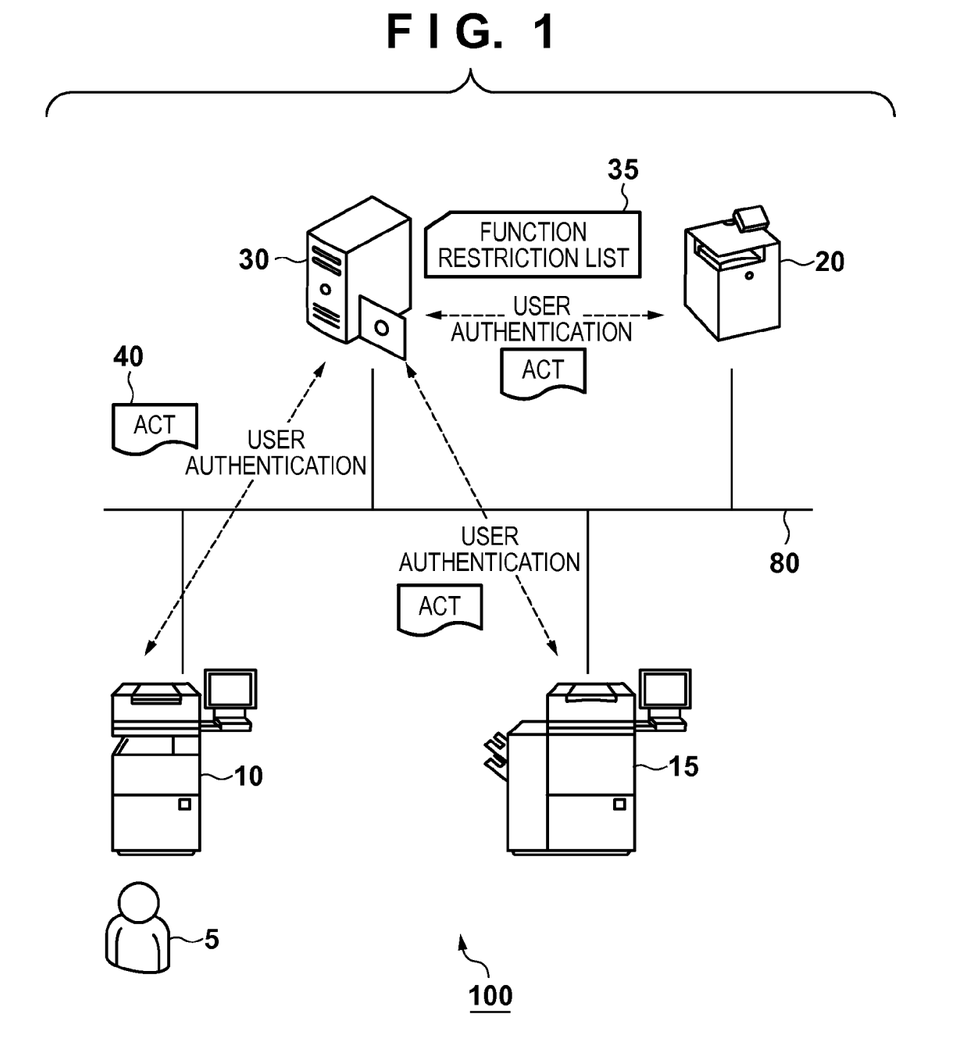
FIG. 1 is a view showing the arrangement of an image forming system.

FIG. 1 is a view showing the arrangement of an image forming system 100 including an image forming apparatus 10. In the image forming system 100, the image forming apparatus 10, an image forming apparatus 15, an image forming apparatus 20, and an authentication server 30 are connected via a network 80 such as a LAN to be able to communicate with each other. As shown in FIG. 1, a user 5 logs in to the image forming apparatus 10 and uses the function of the image forming apparatus 10. The authentication server 30 uses a general information processing apparatus such as a PC, and internally holds a function restriction list 35 which defines function restriction information for each user. The function restriction information is information for restricting, for each user, the use of functions which can be provided by each image forming apparatus in the image forming system 100. An example of the function restriction information is information which permits the copy function but inhibits the send function to a predetermined user. Details of the function restriction list will be described later.

An outline of the operation of the image forming system 100 when the user 5 uses a function of the image forming apparatus 10 he wants will be explained. First, the image forming apparatus 10 makes an inquiry to the authentication server 30 based on login information of the user 5, and determines, based on the result, whether to permit execution of the function. The authentication server 30 sends back an ACT (Access Control Token) token 40 to the image forming apparatus 10 based on the function restriction list 35 and the inquiry information notified from the image forming apparatus 10. The ACT token 40 describes function restriction information about functions which are usable or unusable in the image forming apparatus 10 by the user 5. Upon receiving the ACT token 40, the image forming apparatus 10 imposes function restriction on the user 5 by referring to the contents of the ACT token 40. The image forming apparatus 10 can also display an error or warning about a restricted function to the user 5.

[Arrangement of Image Forming Apparatus]

Figure 2:
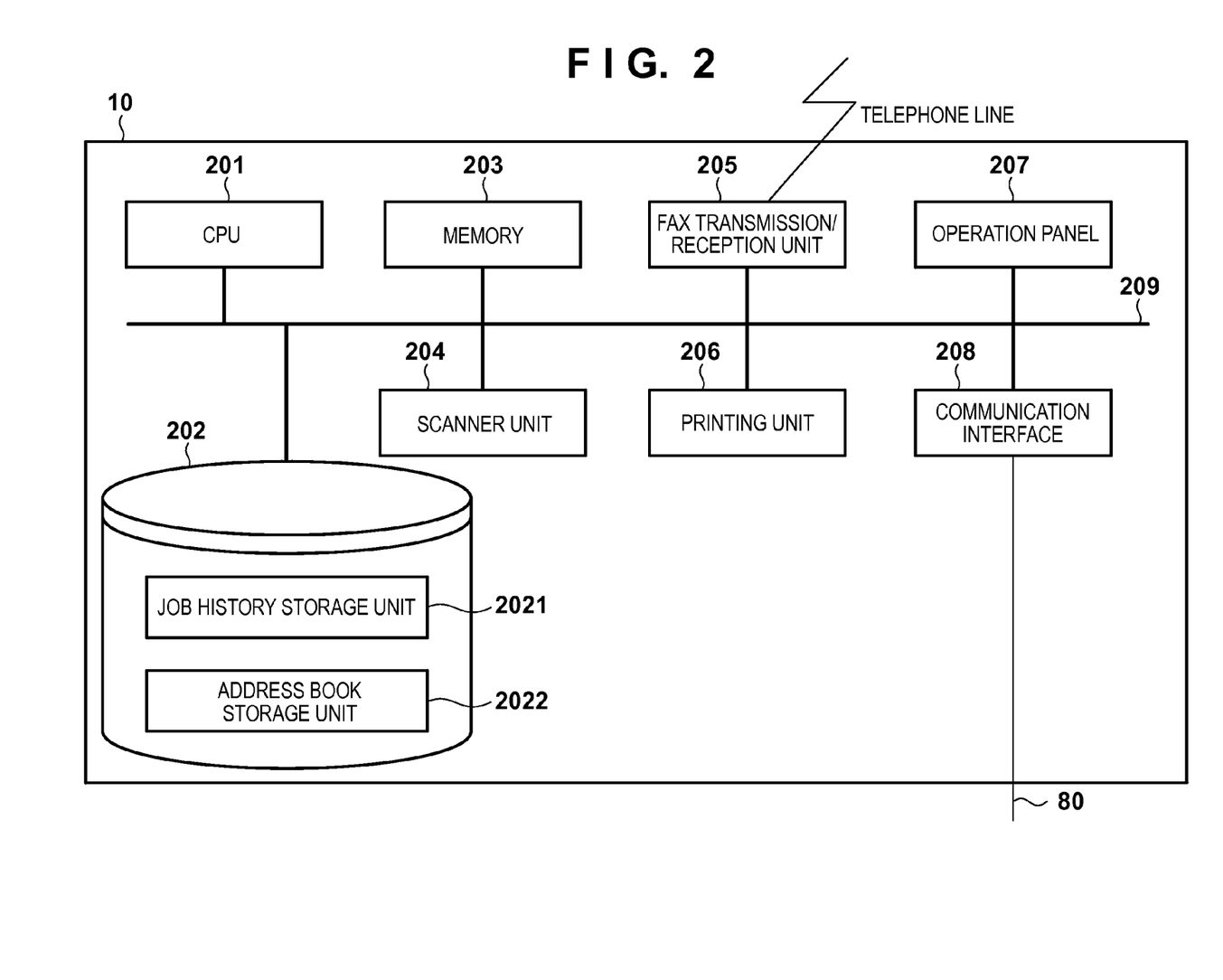
FIG. 2 is a block diagram showing the arrangement of an image forming apparatus.

FIG. 2 is a block diagram showing the arrangement of the image forming apparatuses 10, 15, and 20. Although the image forming apparatus 10 will be described, the following description also applies to the image forming apparatuses 15 and 20. The image forming apparatus 10 includes a CPU 201, auxiliary storage unit 202, memory 203, scanner unit 204, FAX transmission/reception unit 205, printing unit 206, operation panel 207, and communication interface 208. These units are connected via an internal bus 209 to be able to communicate with each other. The auxiliary storage unit 202 is formed from a large-capacity storage device such as a hard disk. The auxiliary storage unit 202 saves a large amount of data, and holds program execution codes and the execution history of each job. The job execution history means the history of a copy job, box print job, print job, send job, or the like which has been executed by controlling the scanner unit 204, printing unit 206, FAX transmission/reception unit 205, communication interface 208, or the like by the CPU 201. A job history storage unit 2021 in the auxiliary storage unit 202 holds the job execution history. An address book storage unit 2022 in the auxiliary storage unit 202 holds an output destination candidate to be used when executing a send job. The auxiliary storage unit 202 stores data which needs to be held for a longer time than in the memory 203 to be described below.

The memory 203 includes a ROM which stores various programs to be executed by the CPU 201, and a RAM which temporarily stores data necessary for control. The scanner unit 204 optically reads a printing medium such as a document. The FAX transmission/reception unit 205 is connected to a telephone line, and performs FAX transmission/reception to/from the outside. The printing unit 206 prints an image or the like on a printing medium based on data. The printing unit 206 prints on a printing medium by, for example, discharging ink from a printhead. The operation panel 207 displays a user interface screen to the user. Also, the operation panel 207 accepts an instruction from the user via the user interface screen. The communication interface 208 performs e-mail transmission, SMB transmission, and transmission/reception of data necessary for authentication via the network 80.

The CPU 201 executes various programs, and controls the overall image forming apparatus 10. The CPU 201 expands, in the memory 203, a program stored in the auxiliary storage unit 202, and executes it. As a result, the CPU 201 designates the respective units and implements various functions such as scanning, printing, and transmission. The CPU 201 determines whether to permit each user of the image forming apparatus 10 to use various functions. The determination method will be described later. The CPU 201 acquires function restriction information of each user serving as the determination criterion from the authentication server 30 via the communication interface 208 and network 80. The CPU 201 designates the respective units in accordance with the acquired function restriction information, and executes function restriction for each user.

[Function Restriction List]

The function restriction list 35 held in the authentication server 30 will be explained with reference to FIGS. 3 and 4. FIG. 3 is a table exemplifying the function restriction list 35. Columns 301 to 307 shown in FIG. 3 are columns of the table. Data in columns 303 to 307 are pieces of function restriction information corresponding to respective user attributes defined in the function restriction list 35. "Permit" defined as function restriction information represents that a user having this attribute is permitted to use the function. "Deny" defined as function restriction information represents that a user having this attribute is inhibited from using the function. "Color" in the function restriction list 35 represents that color printing is permitted. "BW" represents that only monochrome printing is permitted. When a numerical value is defined, or "Yes" or "No" is defined, this is interpreted with a meaning corresponding to contents defined by details of each function in the column 302.

The column 301 represents functions provided by each image forming apparatus. The column 302 represents details of each function represented in the column 301. The columns 303 to 307 represent pieces of function restriction information for respective user attributes. The column 303 represents function restriction information of a user having an attribute "Administrator", and the column 304 represents function restriction information of a user having an attribute "Power User". The column 305 represents function restriction information of a user having an attribute "General User", and the column 306 represents function restriction information of a user having an attribute "Limited User". The column 307 represents function restriction information of a user having an attribute "Guest User". For example, in the embodiment, a user having the attribute "General User" is permitted to use full-color copying and the new destination send function. A user having the attribute "Guest User" is inhibited from using full-color copying and the new destination send function.

[User Management Table]

Figure 4:
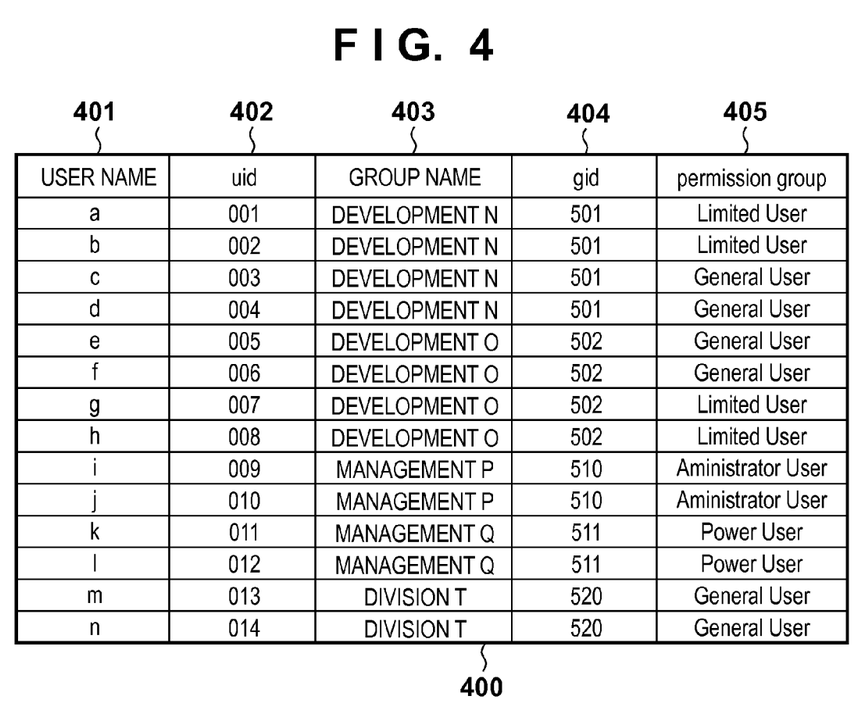
FIG. 4 is a table exemplifying a user management table.

The image forming apparatus 10 internally holds a user management table as shown in FIG. 4. By looking up the user management table as shown in FIG. 4, the image forming apparatus 10 can recognize the attribute of the user 5. FIG. 4 is a table exemplifying a user management table 400. The user management table 400 manages a user name 401, UID 402, group name 403, GID 404, and permission group 405 in correspondence with each other. For example, for user a, the UID 402 is "001", the group name 403 is "development N", the GID 404 is "501", and the permission group 405 is "Limited User". The permission group 405 represents the attribute.

[Execution of Job]

Figure 5:
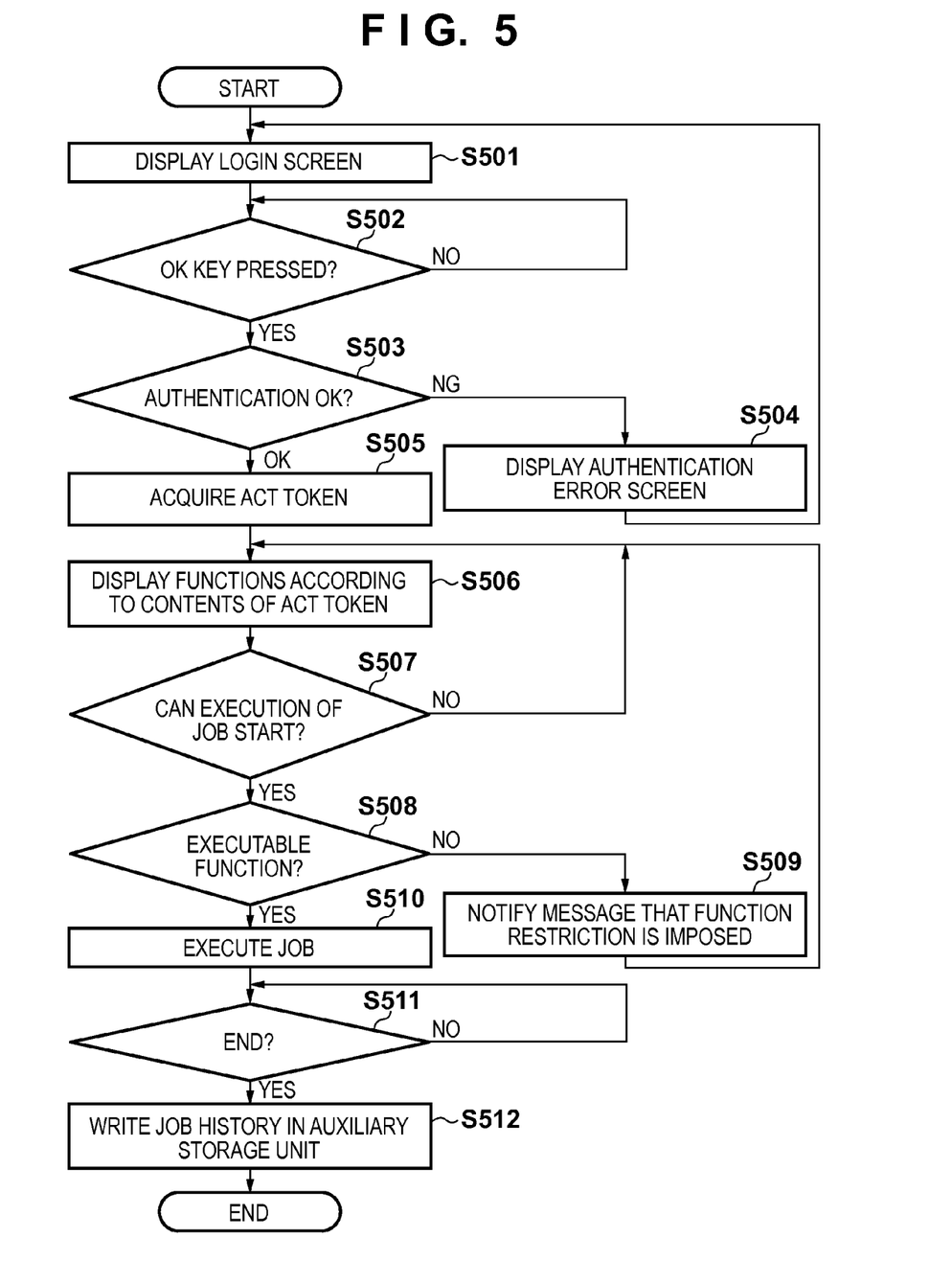
FIG. 5 is a flowchart showing a processing sequence until the job execution history is stored.
Figure 6:
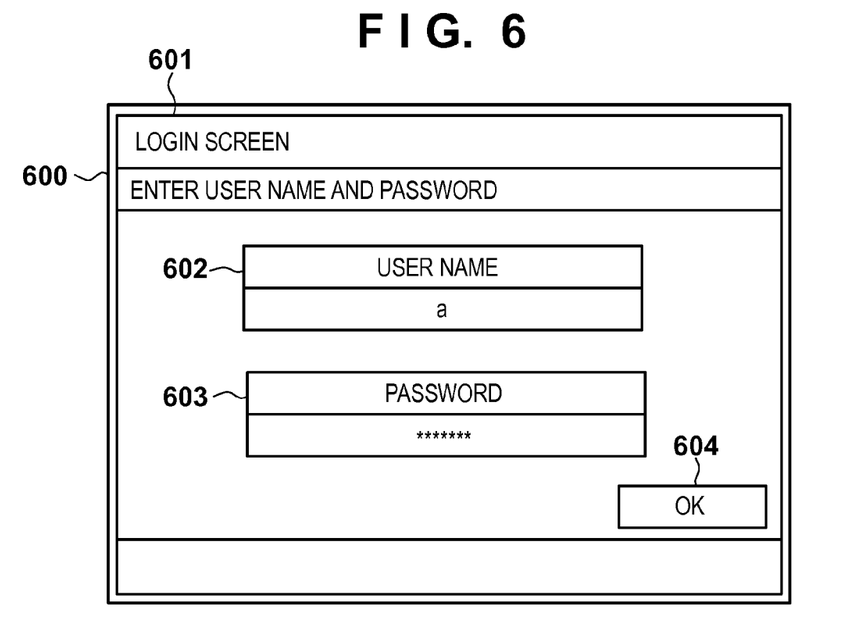
FIG. 6 is a view exemplifying a login screen.

Processing until a job is executed and the execution history of the job is stored in the job history storage unit 2021 of the auxiliary storage unit 202 will be explained with reference to the flowchart of FIG. 5. Note that this processing is implemented by expanding a program stored in the auxiliary storage unit 202 into the memory 203 and executing it by the CPU 201. First, in step S501, the user 5 logs in to the image forming apparatus 10. At this time, the operation panel 207 of the image forming apparatus 10 displays a screen as shown in FIG. 6. As shown in FIG. 6, a liquid crystal operation unit 600 in the operation panel 207 displays a login screen 601. The login screen 601 displays an input field 602 for inputting a user name, an input field 603 for inputting a password, and an OK key 604. In the input field 602, a user name such as "a" is input. In the input field 603, a password corresponding to the user name input to the input field 602 is input. In step S502, it is determined whether the user 5 has pressed the OK key 604. If it is determined that the user 5 has pressed the OK key 604, authentication for permitting the user 5 to log in, and function restriction information are inquired of the authentication server 30 in step S503. The processing in step S502 is repeated until it is determined that the user 5 has pressed the OK key 604. If the user 5 is authenticated and permitted to log in, the CPU 201 acquires the ACT token 40 from the authentication server 30 in step S505. If the user 5 is not authenticated and inhibited from login, an authentication error screen is displayed (step S504), and the process returns again to step S501 to display the login screen.

Figure 7:
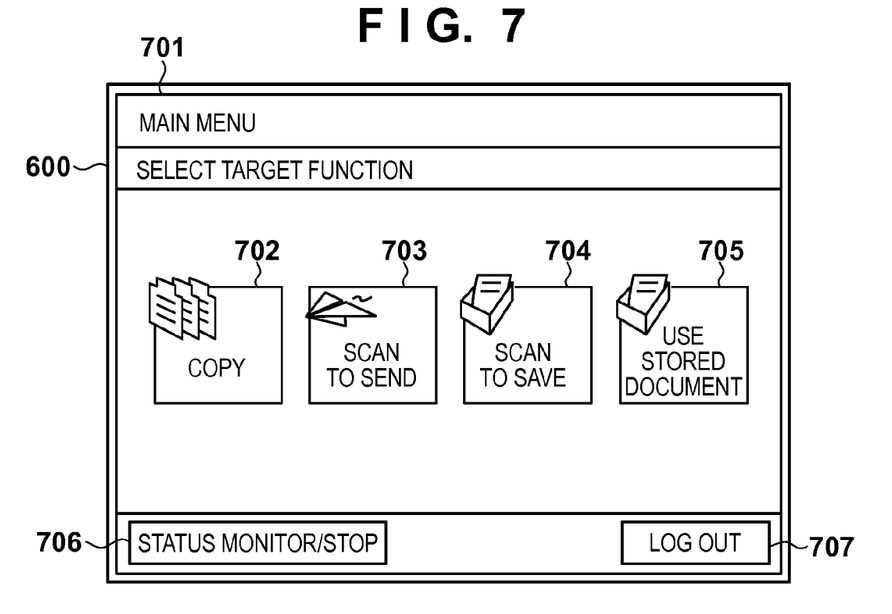
FIG. 7 is a view exemplifying a main menu screen including a function list.

In step S506, the CPU 201 displays a main menu screen including a function list as shown in FIG. 7 in accordance with the contents of the ACT token 40 acquired in step S505. FIG. 7 is a view exemplifying a main menu screen 701. A button 702 in FIG. 7 is used to execute the copy function. When the user presses the button 702, a setting screen for copying, by the printing unit 206, an image read by the scanner unit 204 appears. A button 703 is used to execute the "scan to send" function. When the user presses the button 703, a setting screen for externally sending an image read by the scanner unit 204 via the FAX transmission/reception unit 205 or communication interface 208 appears. A button 704 is used to execute the "scan to save" function. When the user presses the button 704, a setting screen for saving an image read by the scanner unit 204 in the auxiliary storage unit 202 appears. A button 705 is used to execute the "use saved document" function. When the user presses the button 705, a setting screen for copying an image saved in the auxiliary storage unit 202 by the printing unit 206 or externally sending it via the FAX transmission/reception unit 205 or communication interface 208 appears. A button 706 is a status monitor button. When the user presses the button 706, a screen for checking the status of a copy/print job, send job, reception job, or save job during processing, or stopping processing appears. A button 707 is a logout button. When the user presses the button 707, logout is executed.

A case in which the user 5 having a user name "a" logs in to the image forming apparatus 10 will be explained. The CPU 201 looks up the user management table shown in FIG. 4, and recognizes that "Limited User" is set as the attribute in the permission group 405 for the user name "a". Then, the CPU 201 looks up the table shown in FIG. 3, and recognizes that "Permit" is set for the "scan to send" function, "scan to save" function, and "use saved document" function for the user having the attribute "Limited User". That is, the CPU 201 recognizes that these functions are permitted to the user. Also, the CPU 201 recognizes that "Deny" is set for the copy function for the user having the attribute "Limited User", that is, the copy function is inhibited.

Figure 8:
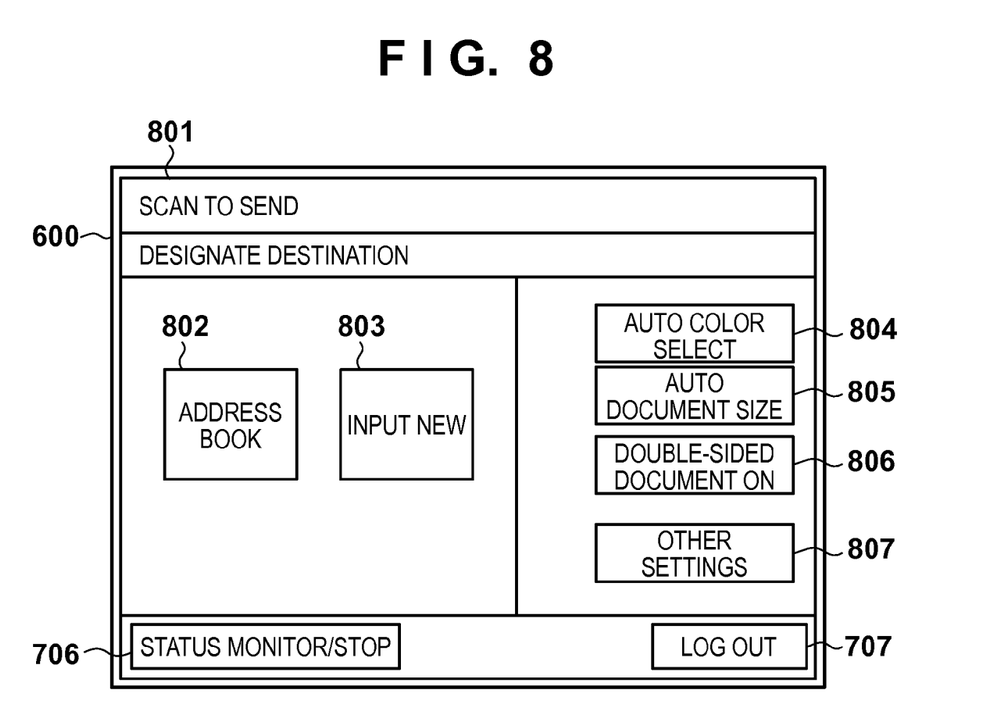
FIG. 8 is a view exemplifying the setting screen of the "scan to send" function.

A case in which the user 5 having the attribute "Limited User" presses the button 703 and selects the "scan to send" function will be explained. FIG. 8 exemplifies a setting screen displayed when the user presses the button 703 and selects the "scan to send" function. When selecting a send destination already registered in the address book storage unit 2022 and sending data, the user 5 presses an address book button 802 and sets the send destination. When newly inputting a send destination and sending data, the user 5 presses an "input new" button 803 and sets the send destination. Buttons 804 to 807 are send function setting buttons, and the user can change the document setting, send setting, and the like by pressing the respective buttons. As shown in FIG. 3, for a user having the attribute "Limited User", "Deny" is set for the function of newly inputting a send destination and sending data. Hence, the user is inhibited from newly inputting a send destination by pressing the "input new" button 803. The "input new" button 803 is displayed with hatching or the like to inhibit the user from using it.

When the CPU 201 detects pressing of the address book button 802, it acquires a registered send destination information list from the address book storage unit 2022, and displays it. The user 5 selects, from the list, a send destination he wants, and designates the start of sending.

The CPU 201 accepts the send start instruction, and determines whether execution of the job can start (step S507). If the CPU 201 determines that execution cannot start owing the network communication status or the like, the process returns to step S506. If the CPU 201 determines that execution can start, it determines whether the user 5 can execute the designated function (step S508). For example, when the user attribute is "Limited User", sending by FAX, FTP, NCP, SMB, and WebDAV is permitted, but sending by E-mail and I-FAX is inhibited. If the destination contains E-mail or I-FAX, the CPU 201 determines that sending is inhibited, displays a warning to this effect, and returns to step S506 (step S509). In this case, an unusable function may be displayed with hatching or the like in addition to the warning display.

If the CPU 201 determines in step S508 that the user 5 can execute the designated function, it executes the function (step S510). The CPU 201 determines whether the job which executes the function has ended (step S511). If the CPU 201 determines that the job has not ended, it repeats the processing in step S511 until the CPU 201 determines that the job has ended. If the CPU 201 determines that the job has ended, it writes the contents set in sending and information about the sending result in the job history storage unit 2021 of the auxiliary storage unit 202 (step S512).

[List Display of Job Execution History]

Figure 9:
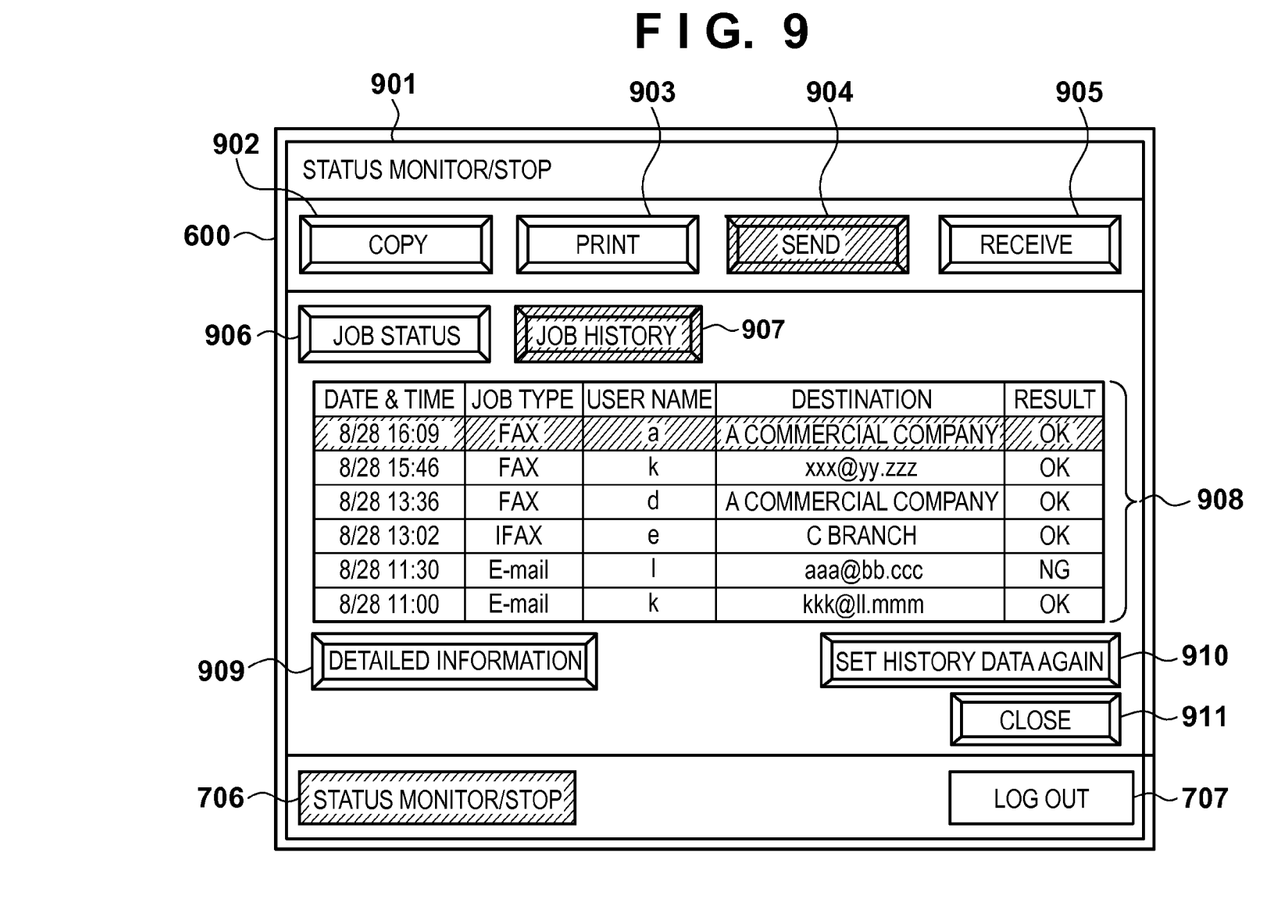
FIG. 9 is a view exemplifying a screen which displays a job status and history display list.

When the user presses the status monitor button 706, the job history written in the job history storage unit 2021 is displayed as a list. FIG. 9 exemplifies a screen which displays a job status and history display list. A status monitor screen 901 displays function buttons, that is, a copy function button 902, print function button 903, send function button 904, and reception function button 905. When the user presses each button, the status and history of a job regarding a function corresponding to the button are displayed. For example, a case in which the user has pressed the send function button 904 will be explained. When the user presses the send function button 904 and then a job status button 906, the status of a send job during sending is displayed. When the user presses the send function button 904 and then a job history button 907, the statuses of execution-completed send jobs are listed and displayed. A case in which the user has pressed the job history button 907 will be explained.

A job history list 908 is a list of execution-completed send jobs. The user can select a job he wants, from the job history list 908 (selection acceptance). "Date & time" represents the date and time when sending was completed, "job type" represents the type of send job in execution, and "user name" represents the name of a user who executed the job. "Destination" displays a send destination registered in the address book storage unit 2022 for a job for which a name is described in the send destination of a send job, and a newly input/sent send destination for a send job for which no name is described. "Result" represents normal end or abnormal end of sending. When the user presses a detailed information button 909, details of the setting contents of each send job are displayed. When the user presses a history data re-setting button 910 (item), he can set again a send job selected in the job history list 908. History data is data describing the setting contents of a job executed in the past. For example, for a job which executed the "copy function", history data is data describing the copy count, output destination, and the like. When the user presses a close button 911, the status monitor screen 901 disappears, and the display returns to a previous screen. As shown in FIG. 9, the history of a send job executed according to the flowchart of FIG. 5 is displayed as represented by the job history list 908.

[Re-Setting of Send Job]

Figure 10A:
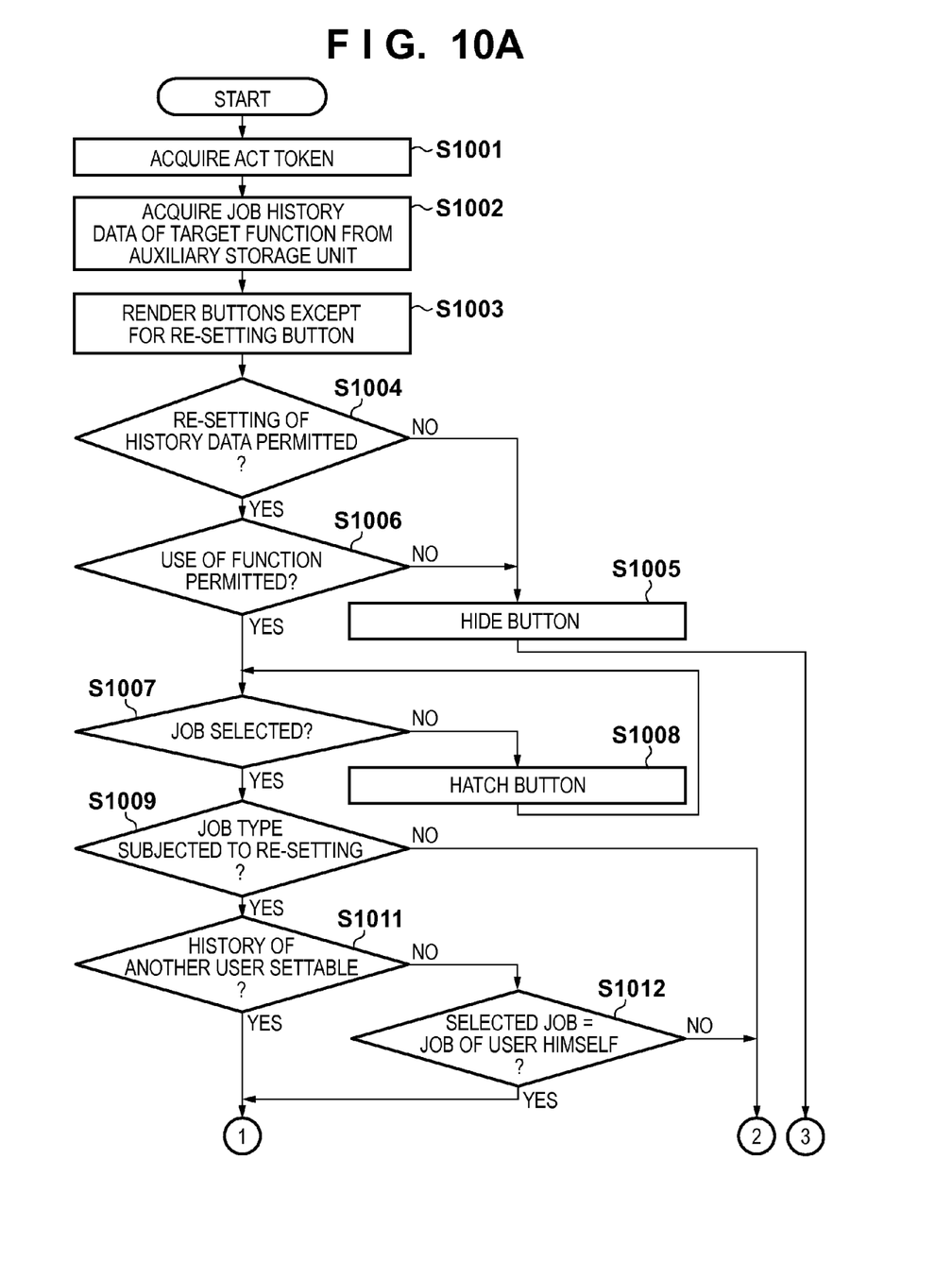
FIGS. 10A and 10B are flowcharts showing a processing sequence of setting again history data of a send job.
Figure 10B:
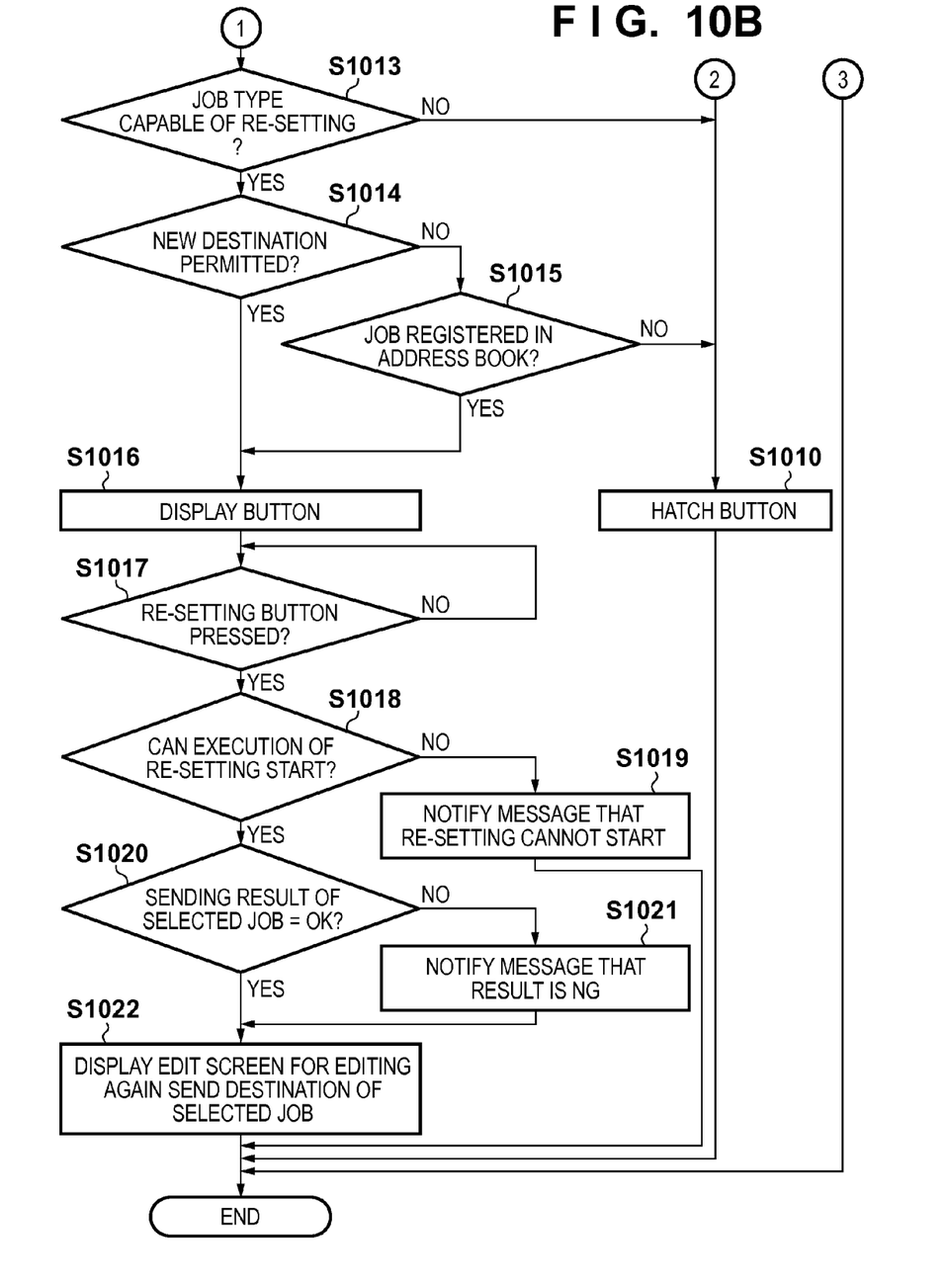

FIGS. 10A and 10B are flowcharts showing a processing sequence of setting again job history data of a send job selected from the send job history list. Note that this processing is implemented by expanding a program stored in the auxiliary storage unit 202 into the memory 203 and executing it by the CPU 201. When the user 5 displays the job history list 908, the CPU 201 acquires again the ACT token 40 from the authentication server 30 (step S1001). By acquiring the ACT token 40 again even in displaying the job history list 908, function restriction can be appropriately imposed in accordance with the current situation even when the operation restriction on the user 5 has changed. Then, the CPU 201 acquires job history data of a corresponding function (send function in this example) from the job history storage unit 2021 in the auxiliary storage unit 202 (step S1002), and renders buttons except for the history data re-setting button 910 (step S1003).

The CPU 201 determines whether the history data re-setting function is permitted to the user 5 (step S1004). For example, if an attribute set in the permission group 405 for the user 5 is "Guest User", the history data re-setting function is inhibited. In this case, the history data re-setting button 910 is not displayed (step S1005). For example, if the attribute is one other than "Guest User", the CPU 201 recognizes that the history data re-setting function is permitted, and advances to the next processing.

Based on whether the user 5 is permitted to use the function, the CPU 201 determines whether to display the history data re-setting button 910 (step S1006). For example, if an attribute set in the permission group 405 for the user 5 is "Limited User", the "scan to send" function is permitted, but the use of the copy function is inhibited. In this case, if the button 902 is selected from the buttons 902 to 905 on the status monitor screen 901, the CPU 201 does not display the history data re-setting button 910 for a copy job history (step S1005). If the CPU 201 determines, based on the use of functions for the user 5, to display the history data re-setting button 910, the process advances to step S1007.

The CPU 201 determines whether the user has selected, from the history of the job history list 908, a send job he wants (step S1007). If the CPU 201 determines that the user has not selected the send job, the history data re-setting button 910 is displayed by hatching or the like not to accept an instruction (step S1008). If the CPU 201 determines that the user has selected a send job he wants, it determines whether the selected send job is of a job type subjected to re-setting of history data (example of job determination). If the CPU 201 determines that the selected send job is not of a job type subjected to re-setting of history data, the history data re-setting button 910 is displayed by hatching or the like not to accept an instruction (step S1010). A job not of a job type subjected to re-setting of history data is a job which targets adjustment or maintenance. Such a job need not be used upon re-setting by the user, and is determined not to be of a job type subjected to re-setting of history data. If the CPU 201 determines that the selected send job is of a job type subjected to re-setting of history data, it determines whether the re-setting function of the job history of another user is permitted to the user 5 (step S1011). For example, if the attribute of the user 5 is "Limited User", the re-setting function of the job history of another user is inhibited, as shown in FIG. 3. In this case, the CPU 201 determines whether the selected send job is a job of the user 5 himself (step S1012). If the CPU 201 determines that the selected send job is not a job of the user 5 himself, that is, is a job of another user, the history data re-setting button 910 is displayed by hatching or the like not to accept an instruction (step S1010). If the CPU 201 determines that the selected send job is a job of the user 5 himself, the process advances to step S1013.

If the re-setting function of the job history of another user is permitted in step S1011, for example, if the attribute of the user 5 is "General User", the CPU 201 determines whether the job is of a job type capable of re-setting history data (step S1013). For example, when the attribute of the user 5 is "General User", sending by FAX, FTP, NCP, SMB, and WebDAV is inhibited. If the user has selected a job sent in one of these formats, the history data re-setting button 910 is displayed by hatching or the like not to accept an instruction (step S1010). In contrast, when the attribute of the user 5 is "General User", sending by E-Mail and I-FAX is permitted. If the user has selected a job sent in either format, the process advances to step S1014.

In step S1014, the CPU 201 determines whether the new destination send function is permitted. For example, when the attribute of the user 5 is "Administrator" or "Power User", the new destination send function is permitted. In this case, the history data re-setting button 910 is displayed to be able to accept an instruction (step S1016: example of acceptance display). If the new destination send function is inhibited, the CPU 201 determines whether the destination of the selected send job is a destination already registered in the address book storage unit 2022. If the CPU 201 determines that the destination of the selected send job is a registered destination, the current sending is not sending to a new destination, and the history data re-setting button 910 is displayed (step S1016). If the CPU 201 determines that the destination of the selected send job is not a registered destination, the current sending is sending to a new destination, and the history data re-setting button 910 is displayed by hatching or the like not to accept an instruction (step S1010).

Then, the CPU 201 determines whether the user has pressed the history data re-setting button 910 (step S1017). The processing in step S1017 is repeated until it is determined that the user has pressed the history data re-setting button 910. If the CPU 201 determines that the user has pressed the history data re-setting button 910, it determines whether execution of re-setting of history data can start (step S1018). For example, when another job is during execution such that it waits for the start of sending after scanning, no next job may be input. In this case, the CPU 201 displays a warning that re-setting of history data cannot start (step S1019).

If the CPU 201 determines that re-setting of history data can start, it determines which of normal end and abnormal end has been registered in the history as the sending result of the selected send job (step S1020). If the CPU 201 determines that abnormal end has been registered in the history, the sending destination may be erroneous, and the CPU 201 displays a warning to this effect to the user (step S1021). In the warning display, a confirmation button or the like may be displayed as an edit instruction, and if the user presses the button, the process may advance to step S1022 (example of instruction acceptance display). If the CPU 201 determines that normal end has been registered in the history, it controls to display an edit screen for editing again the send destination of the selected send job (step S1022: example of edit screen display).

The embodiment has exemplified a send destination, but the destination may be a printout destination instead of the send destination. In the above description, the authentication server 30 connected to the image forming apparatuses 10, 15, and 20 via the network 80 holds the function restriction list 35. However, the image forming apparatus may internally hold the function restriction list 35.

As described above, in the system which restricts usable functions for each user, even when reusing operation history information, function restriction is imposed based on the user authority. This can prevent illicit use by an unauthorized user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-246862, filed Nov. 10, 2011, which is hereby incorporated by reference herein in its entirety.

What is claimed is:

1. A data transmission apparatus comprising:
a scanning unit configured to optically read a document;
a sending unit configured to execute a send job for sending image data generated by reading the document by the scanning unit;
a storage unit configured to store history data for the send job executed by the sending unit, wherein the history data includes destination information indicating a send destination of the image data;
an operation unit configured to display on a display a screen which allows a login user to select an item of history data among history data items corresponding to a plurality of send jobs; and
a control unit configured to,
in at least a condition that history data of a send job of a user different from the login user is selected by the login user via the screen and the login user has a predetermined user attribute, allow the login user to set the destination information included in the selected history data as destination information for a new send job to be executed by the sending unit, and
in at least a condition that history data of a send job of a user different from the login user is selected by the login user via the screen and the login user does not have the predetermined user attribute, restrict the login user from setting the destination information included in the selected history data as destination information for a new send job to be executed by the sending unit.

2. The data transmission apparatus according to claim 1, wherein the control unit is configured to determine whether an execution result of the send job of the selected history data is normal or abnormal; and
wherein the control unit is configured to, in a case where the execution result of the send job of the selected history data is abnormal, control the operation unit to display a warning that the send job of the selected history data was executed abnormally.

3. The data transmission apparatus according to claim 2, wherein the control unit is configured to control the operation unit to display an edit screen for editing the destination information included in the selected history data.

4. The data transmission apparatus according to claim 1, wherein the predetermined user attribute is an administrator attribute.

5. The data transmission apparatus according to claim 1, further comprising:
a management unit configured to manage a plurality of user attribute and manage, for each user attribute, information on whether use of at least one function is permitted or not, and
wherein the control unit is further configured to determine whether to allow the login user to set, to the data transmission apparatus, data included in the selected history data via the screen as data for a new job to be executed, based on the information managed by the management unit.

6. The data transmission apparatus according to claim 5, wherein, the control unit is configured to determine whether to allow the login user to set, to the data transmission apparatus, the data included in the selected history data as the data for the new job to be executed, based on the user attribute of the login user and a function corresponding to a job type of the selected history data.

7. The data transmission apparatus according to claim 1, wherein the control unit is configured to, in a case where a usable function in the data transmission apparatus is restricted for each user attribute and information included in the selected history data is reused by the login user, restrict/ allow the login user to set the destination information included in the selected history data as the destination information for the new send job to be executed by the sending unit, based on a user attribute of the login user.

8. A method of controlling a data transmission apparatus, the method comprising:

optically reading a document;

executing a send job for sending image data generated by reading the document;

storing history data for the send job, wherein the history data includes destination information indicating a send destination of the image data;

displaying on a display a screen which allows a login user to select an item of history data among history data items corresponding to a plurality of send jobs;

in at least a condition that history data of a send job of a user different from the login user is selected by the login user via the screen and the login user has a predetermined user attribute, allowing the login user to set the destination information included in the selected history data as destination information for a new send job to be executed; and in at least a condition that history data of a send job of a user different from the login user is selected by the login user via the screen and the login user does not have the predetermined user attribute, restricting the login user from setting the destination information included in the selected history data as destination information for a new send job to be executed.

9. A non-transitory computer-readable storage medium storing a program for causing a computer to execute a method of controlling a data transmission apparatus, the method comprising:

optically reading a document;

executing a send job for sending image data generated by reading the document;

storing history data for the send job, wherein the history data includes destination information indicating a send destination of the image data;

displaying on a display a screen which allows a login user to select an item of history data among history data items corresponding to a plurality of send jobs;

in at least a condition that history data of a send job of a user different from the login user is selected by the login user via the screen and the login user has a predetermined user attribute, allowing the login user to set the destination information included in the selected history data as destination information for a new send job to be executed; and in at least a condition that history data of a send job of a user different from the login user is selected by the login user via the screen and the login user does not have the predetermined user attribute, restricting the login user from setting the destination information included in the selected history data as destination information for a new send job to be executed.

* * * * *

UNITED STATES PATENT AND TRADEMARK OFFICE
CERTIFICATE OF CORRECTION

PATENT NO. : 9,503,598 B2  
APPLICATION NO. : 13/652890  
DATED : November 22, 2016  
INVENTOR(S) : Kaori Nishiyama

Page 1 of 1

It is certified that error appears in the above-identified patent and that said Letters Patent is hereby corrected as shown below:

On the Title Page (73) Assignee, change "CANON KABUSHIKI HAISHA" to --CANON KABUSHIKI KAISHA--

Signed and Sealed this  
Thirtieth Day of May, 2017

Michelle K. Lee  
*Director of the United States Patent and Trademark Office*